United States Patent [19]

Macy

[11] Patent Number: 5,822,459
[45] Date of Patent: *Oct. 13, 1998

[54] METHOD FOR PROCESSING WAVELET BANDS

[75] Inventor: William Macy, Palo Alto, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 535,550

[22] Filed: Sep. 28, 1995

[51] Int. Cl.$^6$ ............................................. G06K 9/36
[52] U.S. Cl. .................................. 382/240; 382/248
[58] Field of Search .............................. 382/232, 240, 382/248, 276; 358/432; 348/397, 398, 420

[56] References Cited

U.S. PATENT DOCUMENTS

| | | | |
|---|---|---|---|
| 3,202,805 | 8/1965 | Amdahl et al. | 235/164 |
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,344,151 | 8/1982 | White | 364/754 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,633,483 | 12/1986 | Takahashi et al. | 375/25 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,111,422 | 5/1992 | Ullrich | 364/750.5 |
| 5,187,679 | 2/1993 | Vassiliadis | 364/786 |
| 5,218,431 | 6/1993 | Gleicher et al. | 358/13 |
| 5,222,037 | 6/1993 | Taniquchi | 364/748 |
| 5,227,994 | 7/1993 | Mitsuharu | 364/750.5 |
| 5,241,492 | 8/1993 | Girardeau, Jr. | 364/736 |
| 5,262,976 | 11/1993 | Young et al. | 364/760 |
| 5,287,420 | 2/1994 | Barrett | 382/56 |
| 5,293,558 | 3/1994 | Narita et al. | 364/752 |
| 5,321,644 | 6/1994 | Schibinger | 364/737 |
| 5,325,320 | 6/1994 | Chiu | 364/760 |
| 5,420,815 | 5/1995 | Nix et al. | 364/750.5 |
| 5,442,799 | 8/1995 | Murakami et al. | 395/800 |
| 5,446,831 | 8/1995 | Yamashita et al. | 395/102 |
| 5,457,805 | 10/1995 | Nakamura | 395/800 |
| 5,487,022 | 1/1996 | Simpson et al. | 364/715.04 |
| 5,506,865 | 4/1996 | Weaver, Jr. | 375/205 |
| 5,509,129 | 4/1996 | Guttag et al. | 395/375 |
| 5,517,438 | 5/1996 | Dao-Trong et al. | 364/748 |
| 5,528,529 | 6/1996 | Seal | 364/736 |
| 5,563,960 | 10/1996 | Shapiro | 382/239 |
| 5,576,983 | 11/1996 | Shiokawa | 364/754 |

OTHER PUBLICATIONS

Rafael C. Gonzalez and Richard E. Woods, "Digital Image Processing", Jun. 1992, 145–147.

Roth, Jr., *Fundamentals of Logic Design*, West Publishing Company, 1985, pp. 449–450.

R. B. Lee, *Accelerating Multimedia With Enhanced Microprocessors*, IEEE Micro (Apr. 1995), pp. 22–32.

N.Margulis, *i860 Microprocessor Architecture*, McGraw Hill, Inc. (1990) Ch. 6, 7, 8, 10, 11.

(List continued on next page.)

*Primary Examiner*—Andrew W. Johns
*Attorney, Agent, or Firm*—Blakely, Sokoloff, Taylor & Zafman

[57] ABSTRACT

A method and computer system for separating an image into a sequence of wavelet bands, which are equivalent in value to the conventional sequence of wavelet bands, without rearranging the pixel data elements representing the image. The sequence of bands represent different values in reproducing the image. The method of processing the image includes the first step of storing the pixel data elements as first and second packed data sequences in a memory with the pixel data elements stored in an order. A set of intermediate results are generated by performing arithmetic operations between the corresponding pixel data elements of the first and second packed data sequences. The set of intermediate results are then used to generate the sequence of bands by performing arithmetic operations between the intermediate results.

29 Claims, 13 Drawing Sheets

OTHER PUBLICATIONS

*Pentium Processor User's Manual, vol. 3: Architecture and Programming Manual*, Intel Corporation (1993) Ch. 1, 3, 4, 6, 8, and 18.

J. Shipnes, *Graphics Processing with the 88110 RISC Microprocessor*, IEEE, pp. 169–174 (1992).

*MC88110 Second Generation RISC Microprocessor User's Manual*, Motorola Inc., 1991.

*Errata to MC88110 Second Generation RISC Microprocessor User's Manual*, Motorola Inc. 1992, pp. 1–11.

*MC88110 Programmer's Reference Guide*, Motorola, Inc., 1992, pp. 1–4.

*i860 ™ Microprocessor Family Programmer's Reference Manual*, Intel, 1992, pp. 8–1 through 8–39.

B. Case, "Philips Hopes to Displace DSPs with VLIW", *Microprocessor Report*, Dec. 94, pp. 12–18.

*TMS320C2x User's Guide, Texas Instruments*, 1993, pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report, Jan. 1994, pp. 16 & 17.

SPARC Technology Business, *UltraSPARC Multimedia Capabilities On–Chip Support for Real–Time Video and Advanced Graphics*, Sun Microsystems, Sep. 1994.

Kawakami et al., LSI Applications: *A Single–Chip Digital Signal Processor for Voiceband Applications*, Solid State Circuits Conference, Digest of Technical Papers; IEEE International, 1980.

Stollintz, E. et al. *Wavelets for Computer Graphics: A Primer, Part 1*, pp. 76–84, May 1995.

FIGURE 9a

| ALU 203 | | | | |
|---|---|---|---|---|
| (P0 + P8) | 802a (P1 + P9) | 802b (P2 + P10) | 802c (P1 + P9) | 802d |
| x 1 | x 1 | x 1 | x 1 | |
| (P0 + P8) | 902a (P1 + P9) | 902b (P2 + P10) | 902c (P2 + P10) | 902d (P3 + P11) |
| 912a (P0 + P8) + (P1 + P9) | | 912b (P2 + P10) + (P3 + P11) | | |

FIGURE 9b

| ALU 203 | | | | |
|---|---|---|---|---|
| (P0 + P8) | 810a (P1 + P9) | 810b (P2 + P10) | 810c (P3 + P11) | 810d |
| x 1 | x −1 | x 1 | x −1 | |
| (P0 + P8) | 910a −(P1 + P9) | 910b (P2 + P10) | 910c −(P3 + P11) | 910d |
| 920a (P0 + P8) − (P1 + P9) | | 920b (P2 + P10) − (P3 + P11) | | |

METHOD FOR PROCESSING WAVELET BANDS

BACKGROUND OF THE INVENTION

1. Field of the Invention

The invention relates to the field of computer systems. In particular, the invention relates to an improved image processing method.

2. Description of Related Art

Today many computers record and display static and moving video images. The images are represented by an array of points called pixels. Data values for a pixel represent the color or darkness of the pixel. Processing the images on a computer system involves processing high volumes of the pixel data values, which are small in size. As such, there is often a need to convert the pixel data into storage formats that provide for efficient storage and/or accelerated reproduction of the image.

Some image processing algorithms use the Haar wavelet transform, which divides the image into four wavelet bands (b0, b1, b2, b3), whose visual importance differs when reconstructing the image. In the case of image compression applications, after the image has been divided into the four bands, the bands can be quantized by different amounts, which has the effect of reducing the accuracy of the video data by removing some of the information with less visual importance. The amount of quantization can vary. The greater the quantization, the better the compression and the worse the quality of the reconstructed image.

Processing an image begins with recording the image into the computer system. Pixel data representing the image is recorded in an array as shown in Table 1.

TABLE 1

| p0 | p1 | p2 | p3 | p4 | p5 | p6 | p7 |
|---|---|---|---|---|---|---|---|
| p8 | p9 | p10 | p11 | p12 | p13 | p14 | p15 |

Pixel data in the same columns of the array (p0 & p8, p1 & p9) represent similar components in the image. However, when stored in memory, the pixel data is placed in adjacent locations. (i.e. p0 p1 p2 p3 p4 p5 p6 p7 p8 p9 p10 p11 p12 p13 p14 p15). As a result, even though pixel data, such as P7 & P8, are stored in adjacent memory locations, they are not close in value when reproducing the image.

In the next step, the data is loaded from the memory into registers to be processed. Previous methods would only load one element of data at a time per register. As such, the pixel data was loaded in the registers alternately. The first pixel data was loaded into the first register, and then the second pixel data from the same row as the first pixel data was loaded into the second register. The data was then processed by performing an operation between the data in the first register and the data in the second register. Next, the third and fourth pixel data adjacent in the same row of the original array, and the same column as the first and second pixel data, respectively, were loaded in the first and second registers respectively. As a result, as shown below in table 2, the prior method of separating an image into four wavelet bands processed the data by pairing adjacent pixel data within the same rows of the original array of pixel data.

TABLE 2

| b0 = (p0 + p1) + (p8 + P9); | b1 = (p0 + p1) − (p8 + p9) |
|---|---|
| b2 = (p0 − p1) + (p8 − p9); | b3 = (p0 − p1) − (p8 − p9). |

Modern computers, however, load blocks of data elements into the same registers, allowing multiple data to be loaded into a single register in the order it is stored in memory, as shown in Table 3.

TABLE 3

| p0 | p1 | p2 | p3 | p4 | p5 | p6 | p7 |
|---|---|---|---|---|---|---|---|
| p8 | p9 | p10 | p11 | p12 | p13 | p14 | p15 |

Data in the registers is then processed by pairing a first data element in the first register with a first data element in the second register . Thus, the pixel data is unable to be processed by pairing adjacent pixel data within the same rows of the original array of pixel data without first rearranging the data. As a result, the conventional methods of the implementing Haar wavelet transform in a modern computer to separate an image into a sequence of wavelet bands suffer from the drawback of being time consuming, since several steps are required to rearrange the data before it is loaded into the registers. The data must be rearranged so that the pixel data is presented for processing by pairing adjacent pixel data from the same row of the original array of pixel data. Table 4 illustrates a comparison of rearranged data in a register and data without the rearrangement.

TABLE 4

| (data rearranged) | | | | | | | |
|---|---|---|---|---|---|---|---|
| p0 | p2 | p4 | p6 | p8 | p10 | p12 | p14 |
| p1 | p3 | p5 | p7 | p9 | p11 | p13 | p14 |
| (data without rearrangement) | | | | | | | |
| p0, | p1, | p2, | p3, | p4, | p5, | p6, | p7 |
| p8, | p9, | p10, | p11, | p12, | p13, | p14, | p15 |

As such, a new and better method and computer system are needed to separate an image into a sequence of wavelet bands, which are equivalent in value to the conventional sequence of wavelet bands, without rearranging the data before loading the registers.

SUMMARY OF THE INVENTION

In accordance with the present invention, a method and computer system are provided to separate an image into a sequence of wavelet bands, which are equivalent in value to the conventional sequence of wavelet bands, without rearranging the pixel data elements representing the image. The set of bands represent different values in reproducing the image. In one embodiment, the computer method of processing the image includes the first step of storing the pixel data elements as first and second packed data sequence in a memory with the pixel data elements stored in an order. A set of intermediate results are generated by performing arithmetic operations between the corresponding pixel data elements of the first and second packed data sequence. The set of intermediate results are then used to generate the sequence of bands by performing arithmetic operations between the intermediate results.

BRIEF DESCRIPTION OF THE DRAWINGS

FIG. 9 illustrates the pack multiply and add instruction used to generate the sum and difference of adjacent elements in a packed data sequence.

DETAILED DESCRIPTION

FIGS. 1 through 12 of the drawings disclose various embodiments of the present invention for purposes of illustration. One skilled in the art will recognize alternative embodiments that may be employed without departing from the principles of the invention that are illustrated by the structures and methods described herein.

Computer System

Figure 1:
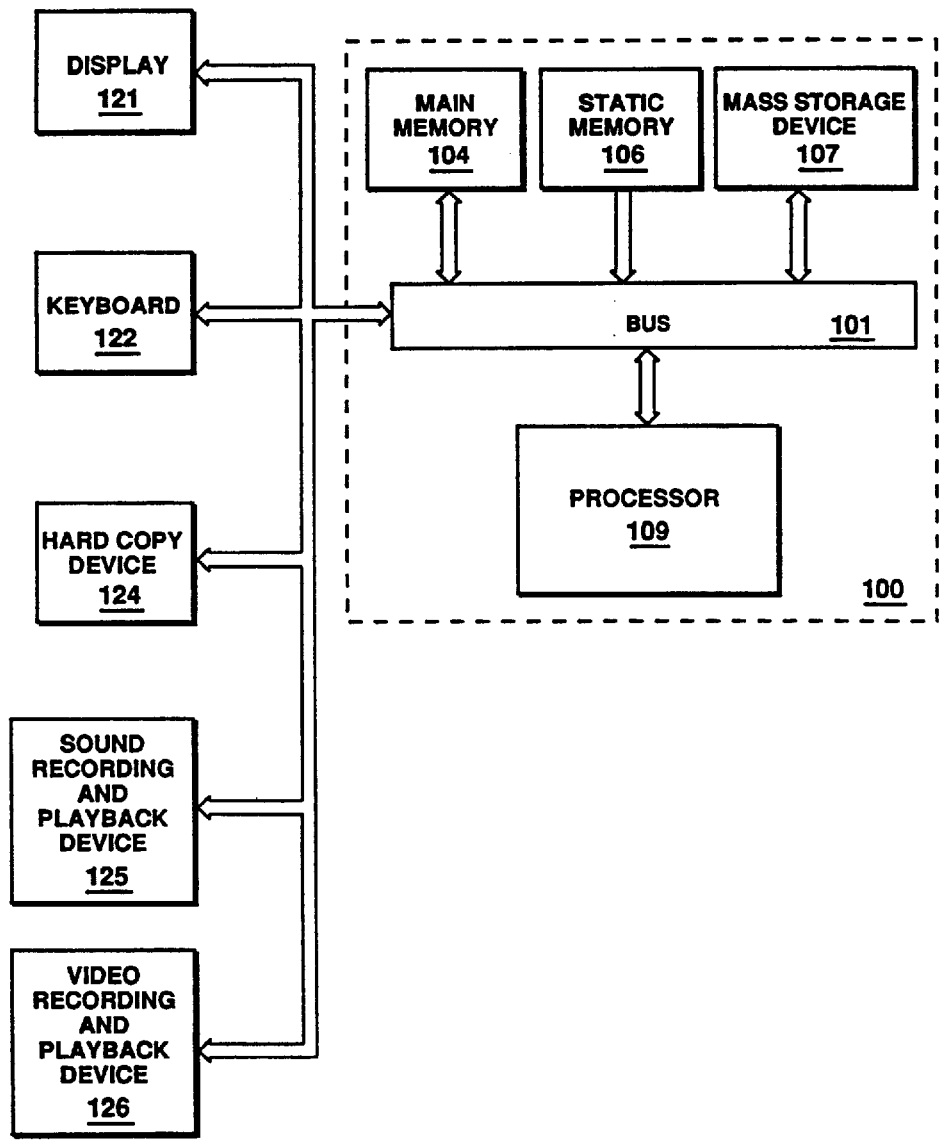
FIG. 1 illustrates an embodiment of the computer system in accordance with the method and apparatus of the present invention.

FIG. 1 illustrates a computer system 100 illustrates a computer system in accordance with the present invention. Computer system 100 comprises a bus or other communication means 101 for communicating information, and a processor 109 coupled with bus 101 for processing information. System 100 further comprises a random access memory (RAM) or other dynamic storage device 104 (referred to as main memory), coupled to bus 101 for storing information and instructions to be executed by processor 109. Computer system 100 also comprises a read only memory (ROM) and/or static storage device 106 coupled to bus 101 for storing static data and instructions for processor 109.

Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 109.

Another device that may be coupled to bus 101 is hard copy device 124 that may be used for printing instructions, data, or other information on a medium such as paper, film, or similar types of media. Additionally, computer system 100 can be coupled to a device for sound recording and/or playback 125 such as an audio digitizer coupled to a microphone for recording information. Further, the computer system 100 may be coupled to a device for video recording and/or playback 126, such as a video digitizer coupled to a camera for recording information. Further, the device may include a digital to analog (D/A) converter for playing back the recorded images.

Processor

Figure 2:
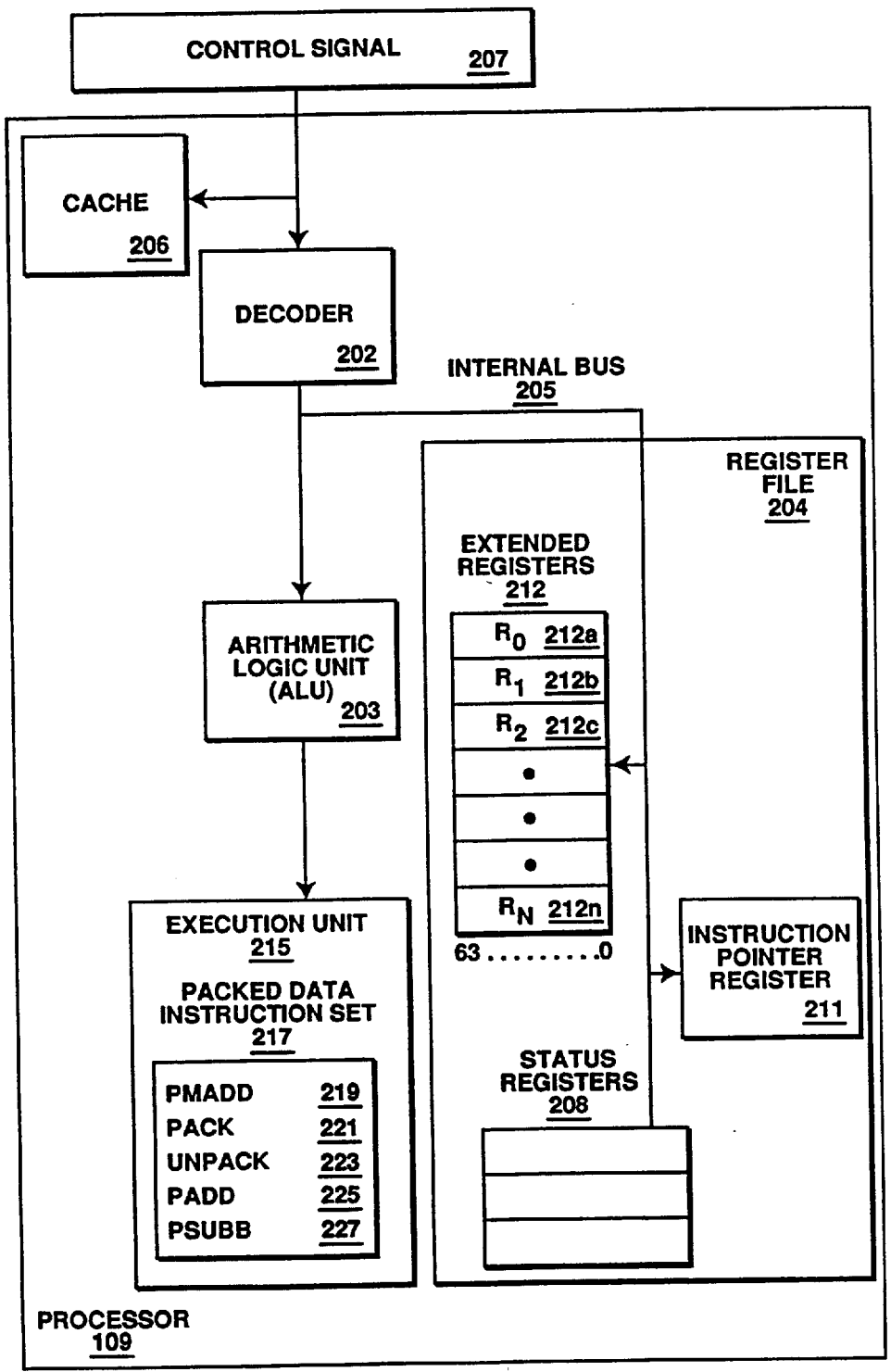
FIG. 2 illustrates an embodiment of the processor incorporated in the present invention.

FIG. 2 is a detailed diagram of processor 109 utilized in accordance with one embodiment. Processor 109 comprises a decoder 202 for decoding controls signals and data used by processor 109. Data can then be stored in register file 204 via internal bus 205.

Depending on the type of data, the data may be stored in extended registers 212, status registers 208, or instruction pointer register 211. Extended registers 212 contains eight registers, $R_{1\ 212}a$ through $R_{n\ 212}f$. Each register is sixty-four bits in length. Status registers 208 indicate the status of processor 109. Instruction pointer 211 stores the address of the next instruction to be executed. Extended registers 212, status registers 208, and instruction pointer register 211 all connect to internal bus 205.

Arithmetic logic unit 203 (ALU) performs the arithmetic and logic operations carried out by processor 109. Such operations may include addition, subtraction and multiplication, etc. ALU 203 connects to internal bus 205. Cache 206 is an optional element of processor 109 and can be used to cache data, including control signals, from, for example, math memory 104. Cache 206 is connected to decoder 202, and is connected to receive control signal 207.

FIG. 2 additionally illustrates that the processor 109 includes an execution unit 215 for executing instructions. The execution unit 215 is shown including packed data instruction set 217 for performing operations on packed data. In one embodiment, the packed data instruction set 217 includes the following instructions: a packed multiply-add instruction 219, a pack instruction 221, an unpack instruction 223, a pack add instruction 225, and a pack subtraction instruction 227. The packed data format and operation of each of these instructions is further described herein.

Data and Storage Formats

Figure 3A:
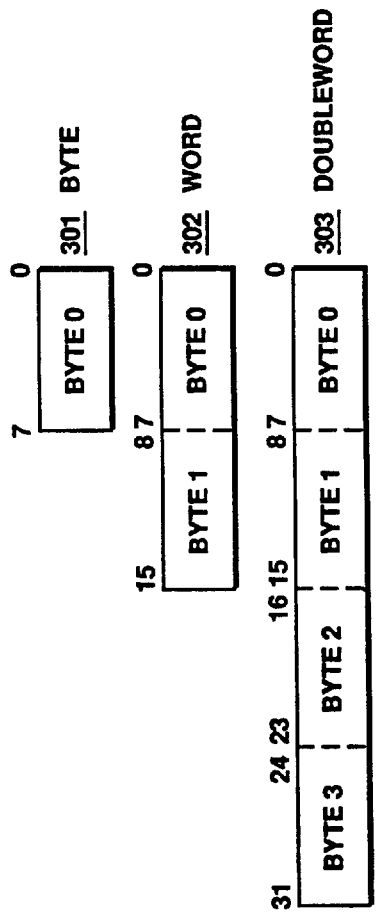
FIG. 3 illustrates various memory data types.

FIG. 3a illustrates some of the data formats as may be used in the computer system of FIG. 1. Processor 109 can manipulate these data formats often used by a Multimedia algorithms. A byte 301 contains eight bits of information. A word 302 contains sixteen bits of information, or two bytes. A doubleword 303 contains thirty-two bits of information, or four bytes.

Figure 3B:
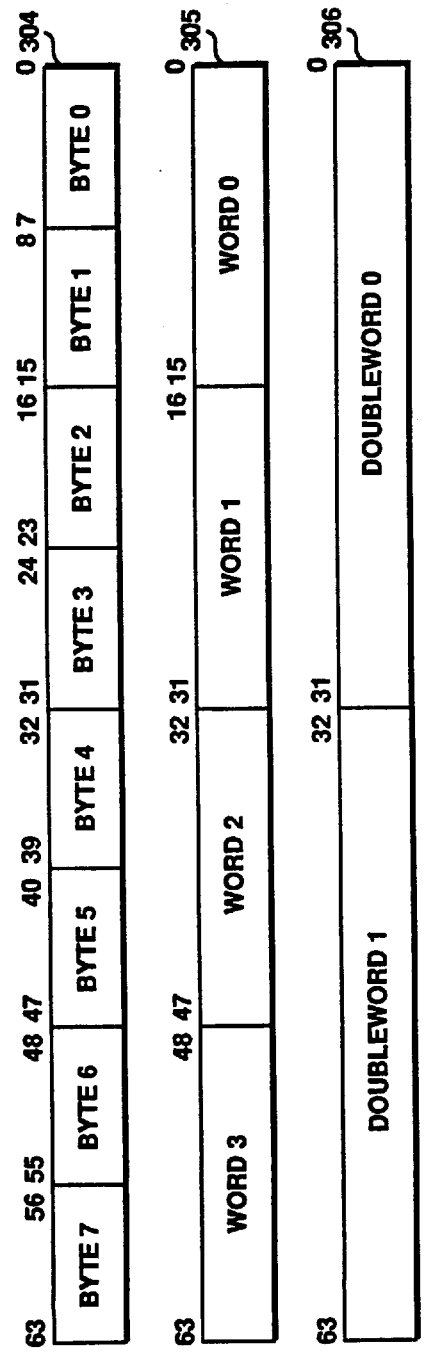

In one embodiment of the invention, extended registers 212 are sixty-four bits in length. However, storage of smaller data types in a sixty-four bit wide register is an inefficient method of storage. As a result, data is packed together in one format referred to as packed data. FIG. 3b illustrates three data formats for packed data. Packed data sequence 304 is sixty-four bits long containing eight fields, each field having a packed data element containing eight bits of information. Packed data sequence 305 contains four fields, each field having a packed data element containing sixteen bits of information. Packed data sequence 306 contains two fields, each field having a packed data element containing thirty-two bits of information.

Method of Processing Images

The present invention involves a method and computer system for separating an image into a sequence of wavelet bands. The sequence of wavelet bands represent different values in reproducing the image. In particular, an accelerated method of separating the image into a sequence of wavelet bands, which are equivalent in value to the conventional sequence of wavelet bands, without rearranging the pixel data before loading the registers, is taught.

In the present invention, a set of intermediate results are first generated through arithmetic operations between pixels data in the same columns of an original array of the pixel data. Prior methods generated a set of intermediate results through arithmetic operations between pixel data in the same rows of the original array of pixel data. As a result, when implemented on modern computers, the prior art method rearranges the data prior to loading the registers in order to process the data by pairing pixel data from the same rows of the array.

One embodiment of the present invention is implemented using the well known Haar transform to separate the pixel data into the wavelet bands. The present invention may be used in any system that uses a Haar transform or similar functions.

Figure 4:
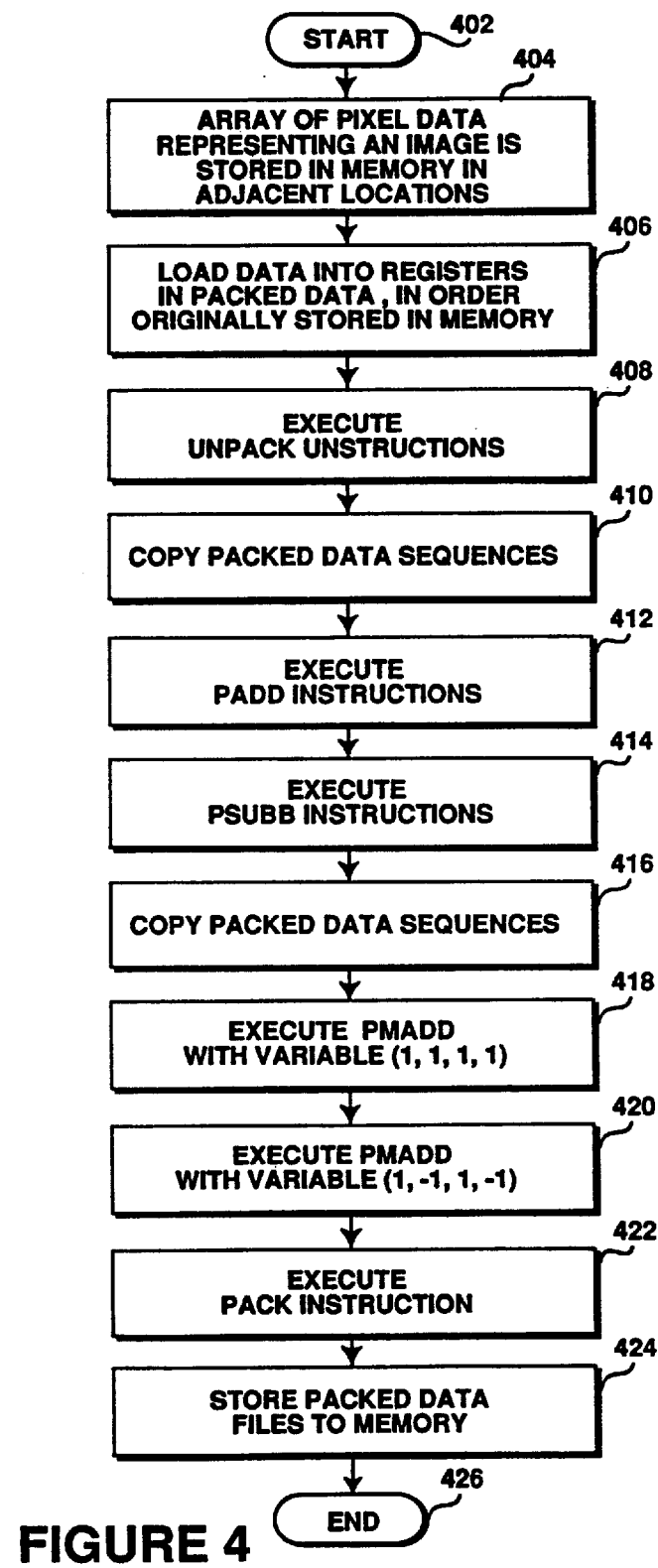
FIG. 4 is a flow diagram illustrating the steps in separating an image into a sequence of wavelet bands in accordance with one embodiment of the present invention.

FIG. 4 illustrates a block diagram of one embodiment. In step 404, illustrated in FIG. 5B, the two by eight array of pixel data 500 is stored in adjacent locations in memory 104. In a second embodiment, pixel data 500 is stored in cache 206 or other memory locations.

Figures 5A, 5B:
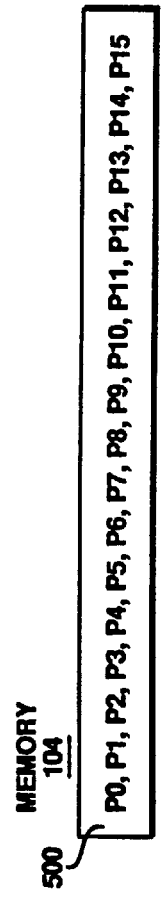
FIG. 5a illustrates an array of pixel data as recorded.
FIG. 5b illustrates an array pixel data stored in memory.
Figure 5C:
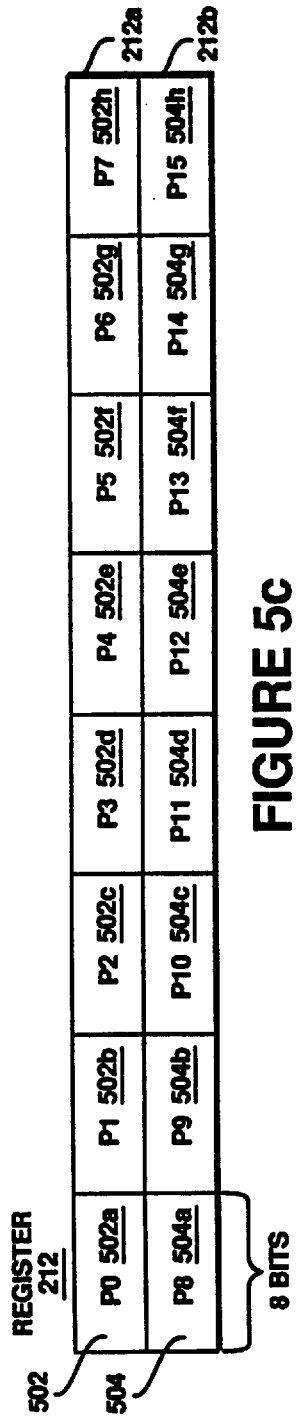
FIG. 5c illustrates pixel data loaded into registers.
Figure 5D:
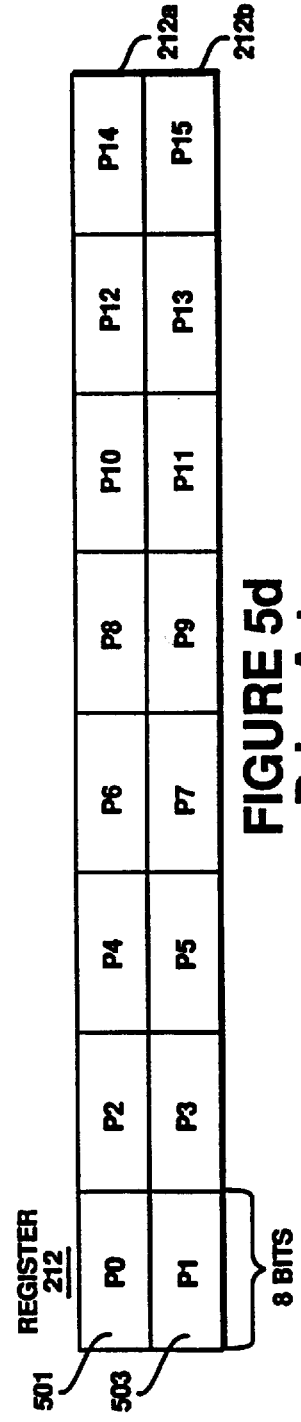
FIG. 5d illustrates the prior art method of loading pixel data into registers.

In step 406, illustrated in FIG. 5C, pixel data 500 is loaded into registers 212a and 212b, as packed data sequences 502 and 504. Each packed data sequence contains eight bytes. The pixel data 500 is loaded in the registers 212a and 212b in the order it is stored in memory 104. In prior methods, as shown in FIG. 5D, the data 500 is rearranged so as to pair sequential pixel data elements in corresponding fields of the data files 501 and 503.

Figure 6:
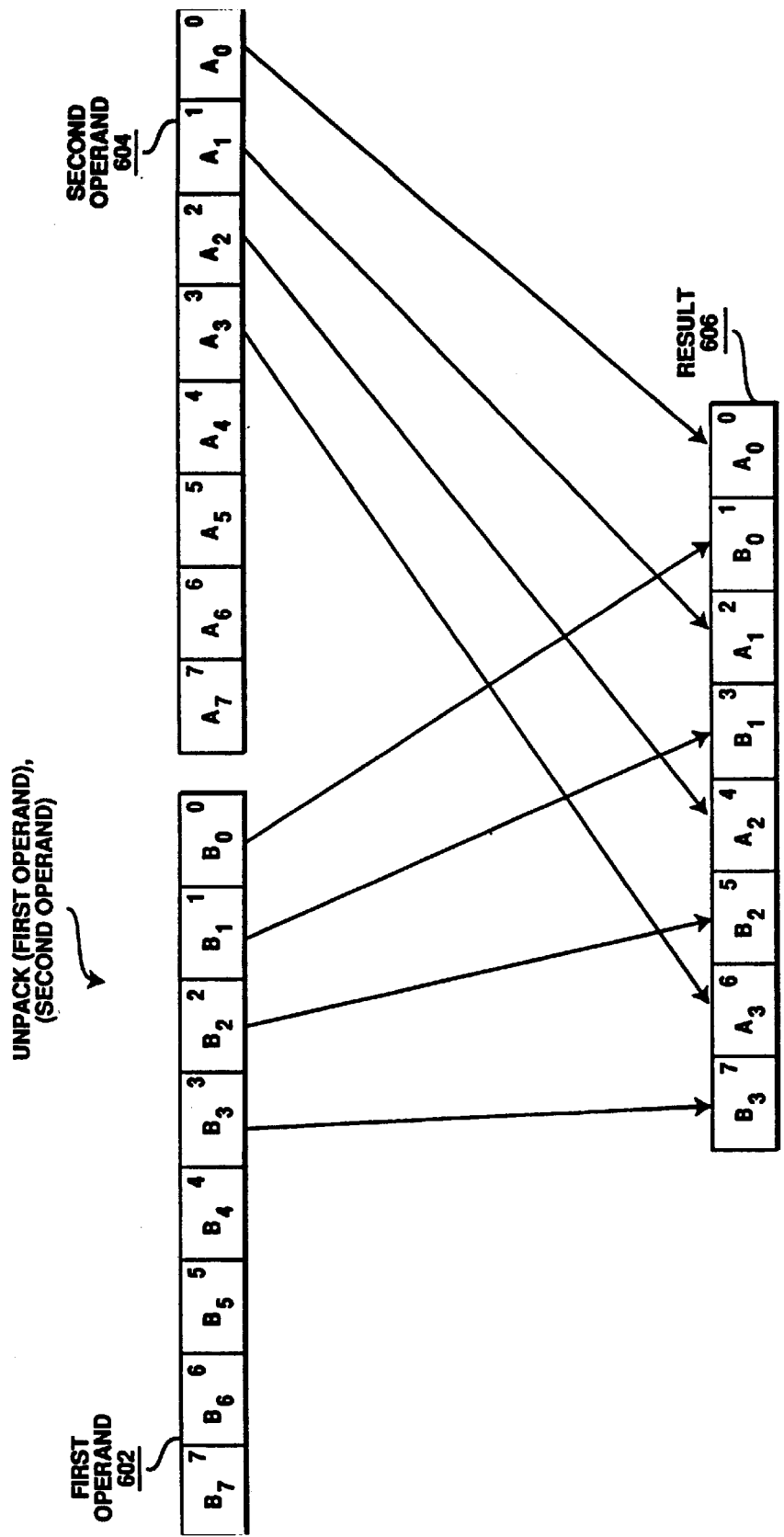
FIG. 6 illustrates the operations of the unpack instruction utilized in the present invention.

In step 408, a set of UNPACK 223 instructions are issued. FIG. 6 is an illustration of the UNPACK 223 instruction. In one embodiment, the UNPACK 223 instruction interleaves low-order data elements from a first packed data sequence 602 and a second packed data sequence 604 into packed data sequence 606. The high order data elements of packed data sequence 602 and 604 are ignored. By choosing either 602 or 604 to be all zeroes, the UNPACK 223 instruction may be used to unpack packed bytes into packed words, or unpack packed words into packed double words, etc. In an alternate embodiment, the high-order data elements of each packed data sequence are interleaved into the result.

Figure 7:
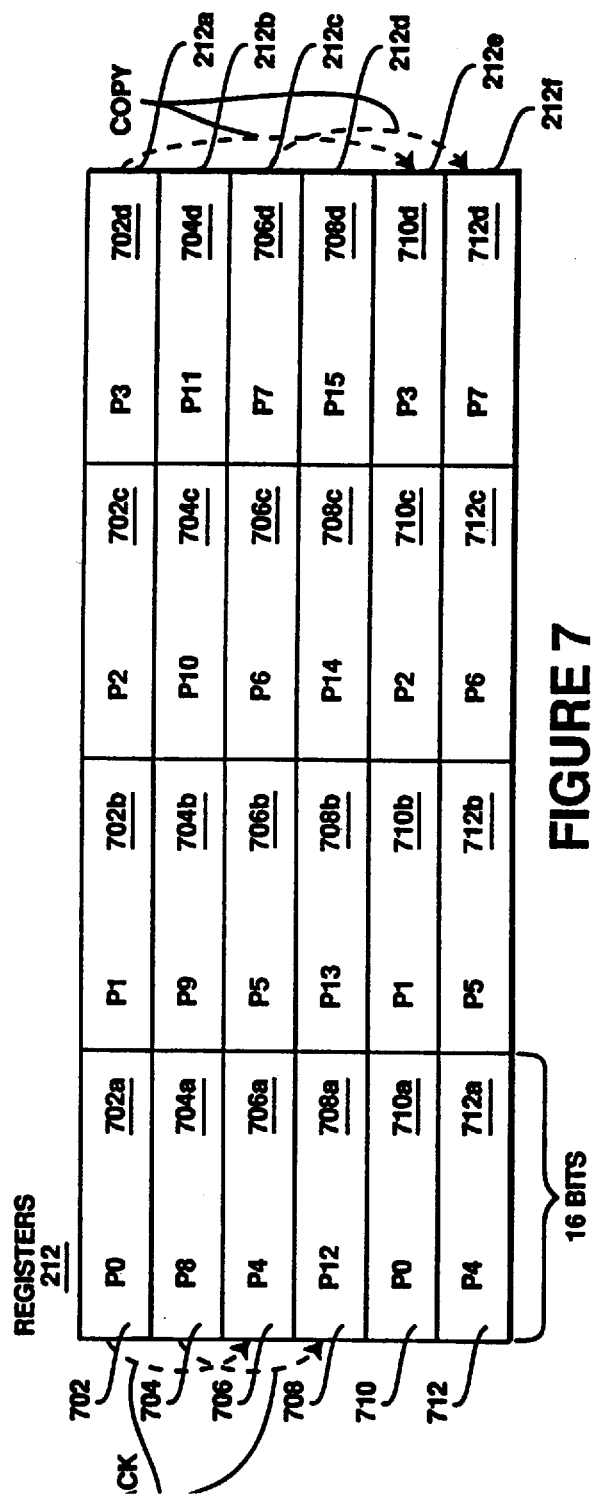
FIG. 7 illustrates the results of an unpack and copy instruction performed on packed data sequence.

FIG. 7 illustrates the results of step 408. Packed data elements 502e 502h, of packed data sequence 502, have been unpacked to the register 212c, and packed data elements 504e–504h, of packed data sequence 504, have been unpacked to register 212d. As a result, registers 212a–212d each contain a packed data sequence with four elements that have each expanded from eight bits in length to sixteen bits in length. Unpacking register file 212 allows for a possible overflow during an arithmetic operation between two corresponding packed data elements.

In step 410, a set of copy instructions are issued. In response to the copy instructions, also illustrated in FIG. 7, packed data sequences 702 & 706 are copied to vacant registers 212e & 212f, respectively. Packed data sequences 702 & 706 are copied because the results of an operation between packed data sequences are stored to one of the registers from which the data originally came from, and are written over any data stored in the register. Nonetheless, the present invention could be implemented on a computer systems wherein copying the packed data sequences may be unnecessary because the results of an operation may be stored to any register.

Figure 8:
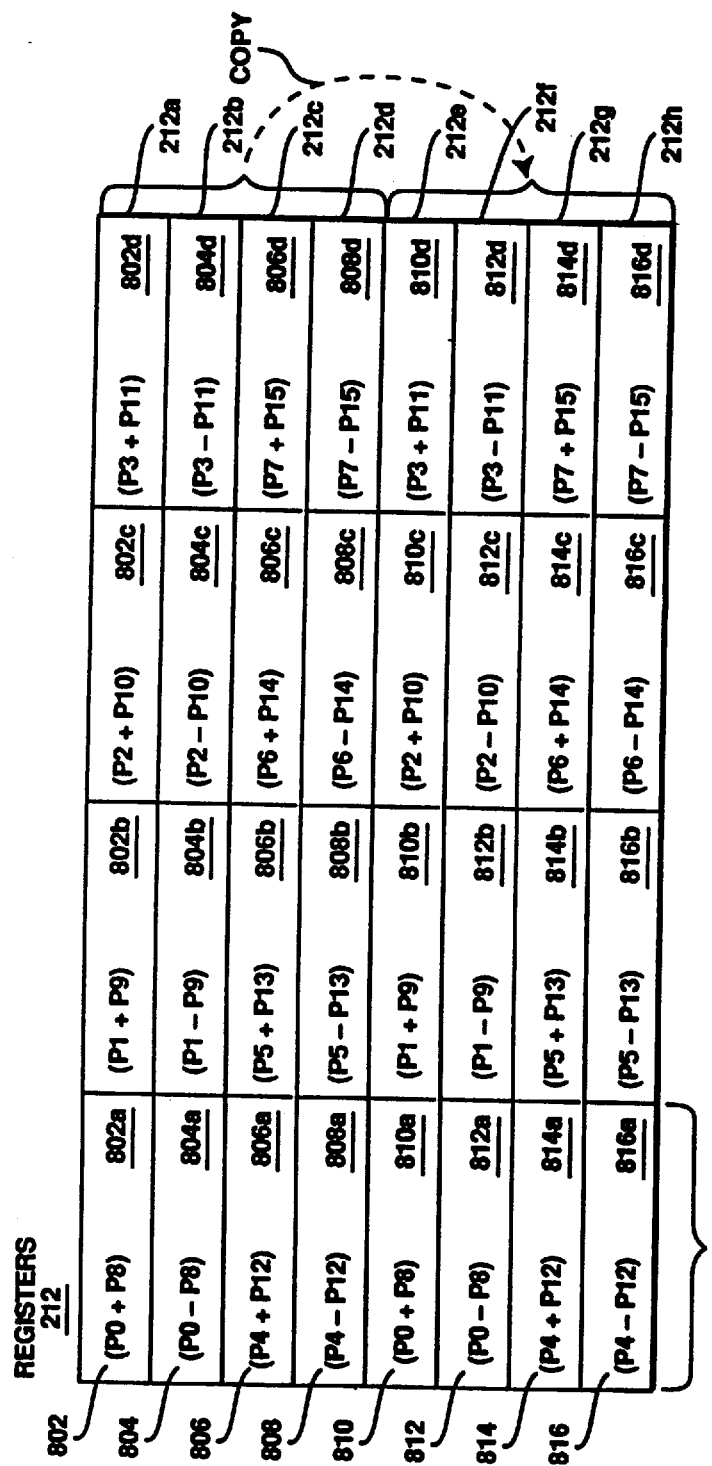
FIG. 8 illustrates the results of the pack add and pack subtraction instruction performed on packed data.

In step 412, a set of intermediate results are generated in response to a set of Single Instruction/Multiple Data (SIMD) PADD 225 instructions. The PADD 225 instruction loads packed data sequences 702 & 704 into the ALU 203. The ALU 203 generates the sums of the corresponding packed data elements 702a & 704a, 702b & 704b, 702c & 704c, and 702d & 704d. As shown in FIG. 8, the intermediate results are stored as packed data sequence 802, comprising four packed data elements, each sixteen bits in length.

Step 412 is repeated on packed data sequences 706 and 708, thereby generating the intermediate results of packed data sequence 806, representing the sum of the corresponding packed data elements of the packed data sequences 706 and 708.

In step 414, additional intermediate results are generated in response to a set of SIMD PSUBB 227 instructions. The PSUBB 227 instruction loads packed data sequences 704 and 710 (which is the duplicate of packed data sequence 702) into the ALU 203. The ALU 203 generates the difference of the corresponding packed data elements 704a & 710a, 704b & 710b, 704c & 710c, and 704d & 710d. As shown in FIG. 8, the intermediate results are stored as packed data sequence 804.

Step 414, is repeated on packed data sequences 708 and 712 (which is the duplicate of packed data sequence 706), generating the difference of the corresponding packed data elements in packed data sequences 708 & 712. As shown in FIG. 8, the intermediate results are stored as packed data sequence 808.

In steps 412 & 414, the pixel data elements are processed by pairing pixel data from the same columns of the original array of pixel data 500. In the prior method of separating images into a sequence of bands, the pixel data is processed by pairing pixel data elements from the same row of the original array of pixel data 500. Processing pixel data elements within the same columns of the array, provides an accelerated method of decomposing the image, by avoiding the need to rearrange the data prior to loading the registers.

In step 416, a second set of copy instructions are issued. In response, as illustrated in FIG. 8, packed data sequences 802–808 are copied to registers 212e–212h. Packed data sequences 802–808 are copied because two arithmetic operations are to be performed on each packed data sequence.

In step 418 & 420, a second aspect of the present invention is implemented. Specifically, the SIMD PMADD 219 instruction is used to generate as set of final results representing the sum or differences of adjacent elements in a packed data sequence, without separating the elements from the packed data sequence.

Figure 10:
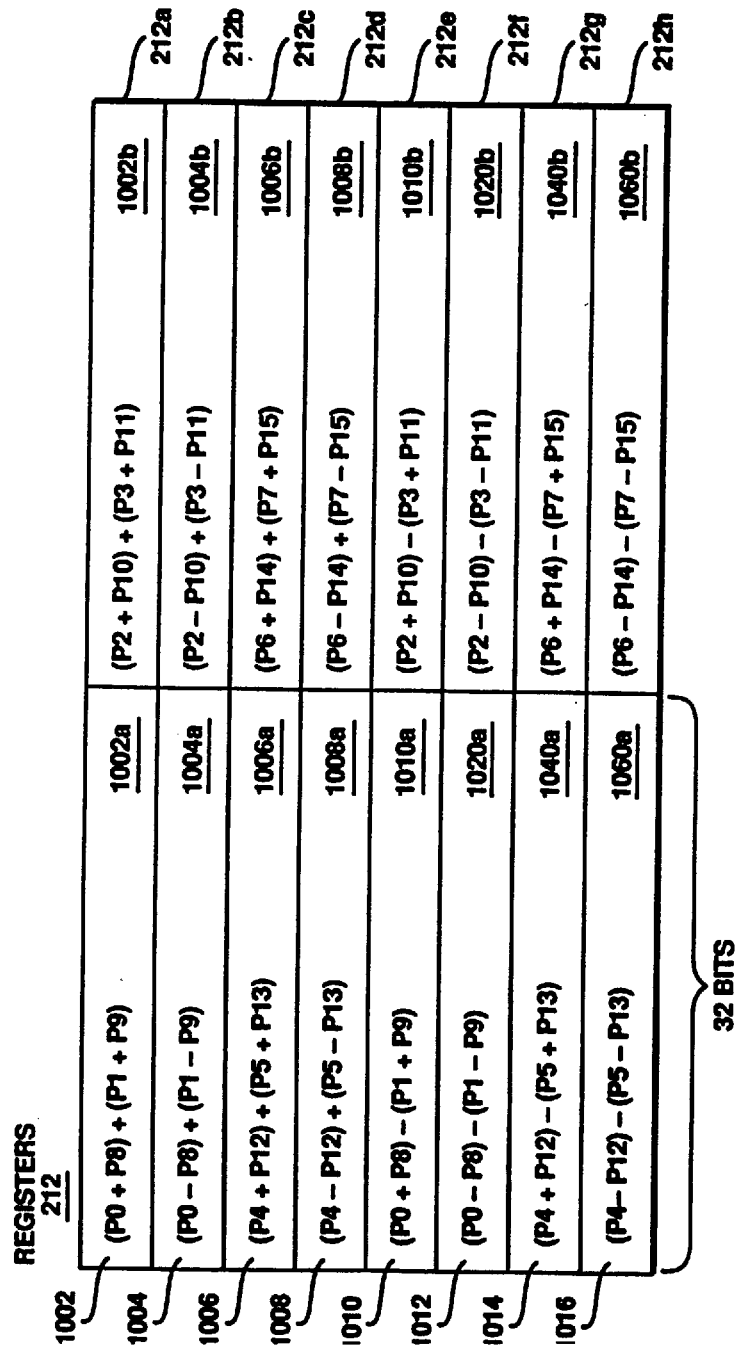
FIG. 10 illustrates the results of the pack multiply and add instruction performed on packed data sequence.

FIG. 9A illustrates the PMADD 219 instruction generating the sum of adjacent elements. The PMADD 219 instruction specifies register 212a, containing packed data sequence 802, and the variable (1,1,1,1), as operands. In one clock cycle, the variable (1,1,1,1) is retrieved from a local memory and multiplied with the corresponding four packed data elements in the packed data sequence 802, generating four separate products 902a, 902b, 902c, & 902d. Elements 902a & 902b are then added to produce element 912a, which is the sum of elements 802a & 802b. Elements 902c & 902d are added to produce element 912b, which is the sum of elements 802c & 802d. As shown in FIG. 10, elements 912a & 912b are then stored as packed data sequence 1002, comprising two elements, each thirty-two bits in length.

FIG. 9B illustrates using the PMADD 219 instruction to generate the difference of adjacent elements. The PMADD 219 instruction specifies register 212e containing packed data sequence 810, and variable (1,-1,1,-1), as operands. In one clock cycle, the variable (1,-1,1,-11) is retrieved from a local memory and multiplied with the corresponding four packed data elements in the packed data sequence 810, generating four separate products 910a, 910b, 910c, & 910d. Elements 910a & 910b are then added to produce the element 920a, which is the difference of elements 810a & 810b. Elements 910c & 910d are added to produce element 920b, which is the difference between elements 810c & 810d. As shown in FIG. 10, elements 920a & 920b are then stored as packed data sequence 1010.

In one embodiment, the PMADD 219 instruction is repeatedly issued to generate the sum of adjacent elements in the packed data sequences 804, 806 & 808, and the difference of adjacent elements in packed data sequences 812, 814, & 816. As further illustrated in FIG. 10, the results of the PMADD operations are respectively placed in packed data sequences 1004–1016.

Figure 11:
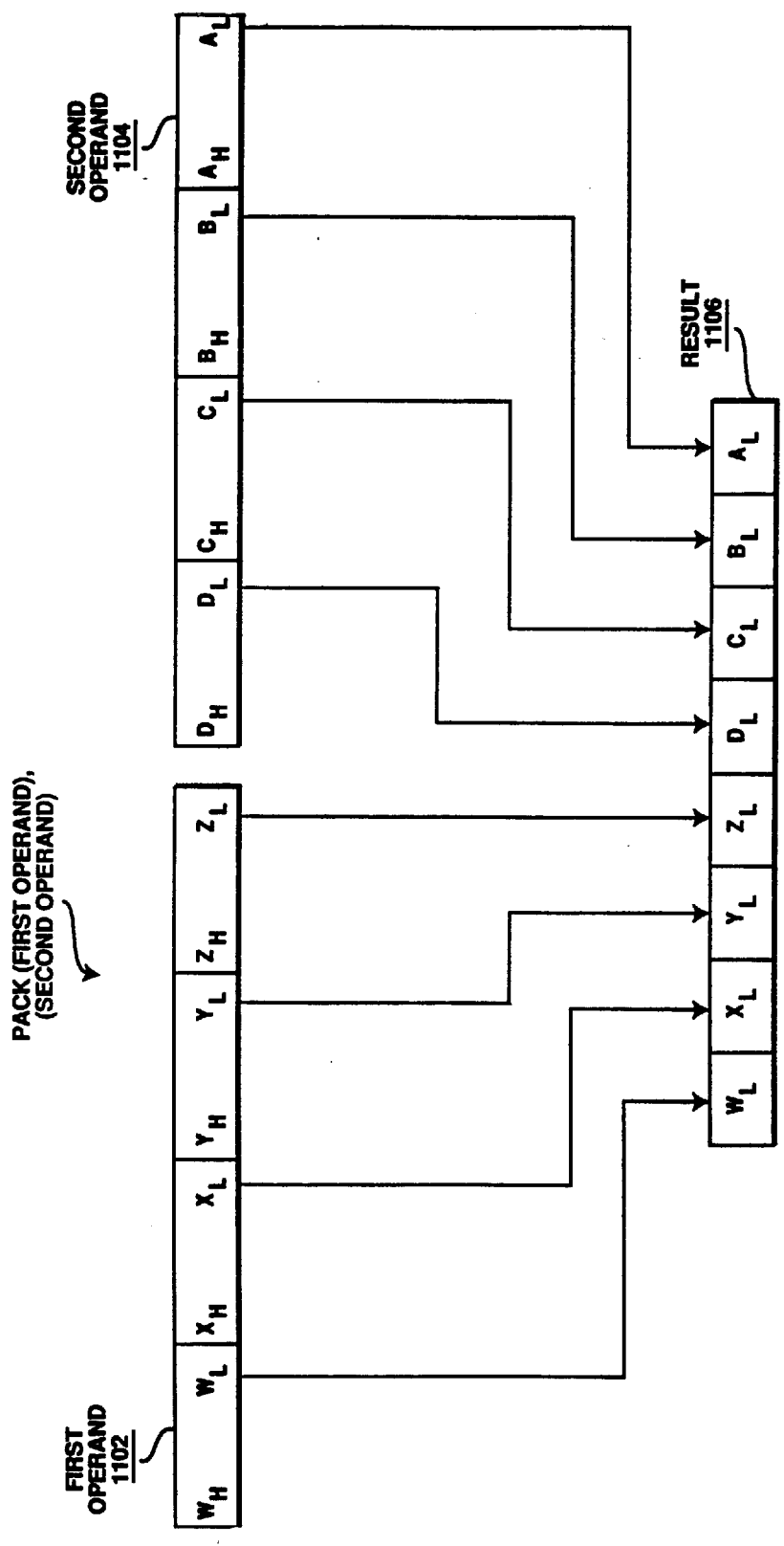
FIG. 11 illustrates the operation of the pack instruction utilized in the present invention.

In step 422, a set of SIMD PACK 221 instructions are issued. FIG. 11, illustrates the operation of the PACK 221 instruction according to one embodiment of the invention. In this example, the PACK 221 instruction converts packed data elements from packed words into packed bytes. The low-order bytes of each packed word data element in a first operand 1102 are packed into the high-order bytes of a result 1106, as shown. The low-order bytes of each packed word data element in a second operand 1104 are packed into the low-order bytes of the result 1106 as shown. In an alternate embodiment, the high-order bytes of each data element in the first and second operands are packed into the result.

Figure 12:
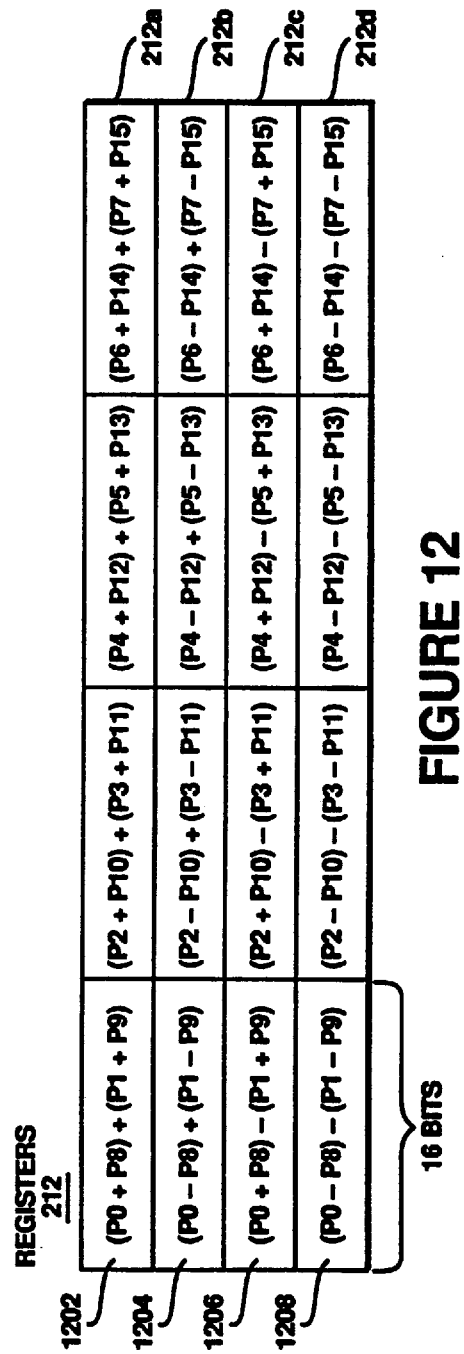
FIG. 12 illustrates the sequence of wavelet bands stored in registers.

The results of step 422 are illustrated in FIG. 12. The set of PACK 221 instructions converted packed data sequences 1002–1016 into packed data sequences 1202–1208. As a result, packed data sequence 1202 possesses the sum of the sums of the original pixel data 500, packed data sequence 1204 possesses the sum of the differences, packed data sequence 1206 possesses the difference of the sums, and packed data sequence 1208 possesses the difference of the differences of the pixel data 500. Packed data sequences 1202–1208 each contain four fields, each field having been reduced from thirty-two bits to sixteen bits in length.

In the last step 424, the packed data sequences 1202–1208 are stored in main memory 104 or other memory locations disclosed herein.

From the above description, it will be apparent that the invention disclosed herein provides a novel and advantageous method of processing data representing an image. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. A method of processing an image consisting of a plurality of pixel data elements, comprising the computer implemented steps of:
    a) loading said pixel data elements from a memory device in an order said pixel data elements are stored in said memory device, said pixel data elements loaded as first and second packed data sequences;
    b) generating a set of intermediate results by performing an arithmetic operation between the corresponding pixel data elements of said first and second packed data sequences; and
    c) generating a sequence of wavelet bands by performing an arithmetic operation between said intermediate results.

2. The method of claim 1 wherein said set of intermediate results include:
    a first intermediate result representing a sum of first pixel data elements in the first and second packed data sequences;
    a second intermediate result representing a difference of the first pixel data elements in the first and second packed data sequences;
    a third intermediate result representing a sum of second pixel data elements in the first and second packed data sequences; and
    a fourth intermediate result representing a difference of the second pixel data elements in the first and second packed data sequences.

3. The method of claim 2 wherein said sequence of wavelet bands include:
    a first band representing a sum of the first and third intermediate results;
    a second band representing a difference of the first and third intermediate results;
    a third band representing a difference of the second and fourth intermediate results; and
    a fourth band representing a sum of the second and fourth intermediate result.

4. The method of claim 3, wherein said second and third bands are generated by multiplying an intermediate result by a negative one, generating a product, and adding said product to an intermediate result.

5. The method of claim 4, wherein said first and fourth bands are generated by multiplying an intermediate result by a positive one, generating a product, and adding said product to an intermediate result.

6. The method of claim 5, further including the steps of:
    unpacking four pixel data elements from the first packed data sequence to generate a third packed data sequence, and unpacking four pixel data elements from the second packed data sequence to generate a fourth packed data sequence.

7. The method of claim 6, wherein each of said pixel data elements of said packed data sequences are eight bits in length prior to said unpacking.

8. The method of claim 7, wherein after said step of unpacking, pixel data elements are sixteen bits in length, said intermediate results are sixteen bits in length, and said bands are thirty-two bits in length.

9. The method of claim 8, wherein said intermediate results further include:
    a fifth intermediate result representing a sum of third pixel data elements in the first and second packed data sequences;
    a sixth intermediate result representing a difference of the third pixel data elements in the first and second packed data sequences;
    a seventh intermediate result representing a sum of fourth pixel data elements in the first and second packed data sequences; and
    an eighth intermediate result representing a difference of the fourth pixel data elements in the first and second packed data sequences.

10. The method of claim 9, wherein said sequence of bands include:

a fifth band representing a sum of the fifth and seventh intermediate results;

a sixth band representing a difference of the fifth and seventh intermediate results;

a seventh band representing a difference of the sixth and eighth intermediate results; and an eighth band representing a sum of the sixth and eighth intermediate results.

11. The method of claim 10, further including the steps of:

generating a second set of intermediate results with the pixel data elements of the third and fourth packed data sequences.

12. The method of claim 11, further including the steps of:

generating a second sequence of bands with the second set of intermediate results.

13. A machine-readable medium having stored thereon data representing sequences of instructions, said sequences of instructions which, when executed by a processor, cause said processor to perform the steps comprising of:

a) loading said pixel data elements from a memory device in an order said pixel data elements are stored in said memory device, said pixel data elements loaded as first and second packed data sequences;

b) generating a set of intermediate results by performing an arithmetic operation between the corresponding pixel data elements of said first and second packed data sequences; and c) generating a sequence of wavelet bands by performing an arithmetic operation between said intermediate results.

14. The machine readable medium of claim 13 wherein said set of intermediate results include:

a first intermediate result representing a sum of first pixel data elements in the first and second packed data sequences;

a second intermediate result representing a difference of the first pixel data elements in the first and second packed data sequences;

a third intermediate result representing a sum of second pixel data elements in the first and second packed data sequences; and a fourth intermediate result representing a difference of the second pixel data elements in the first and second packed data sequences.

15. The machine readable medium of claim 14 wherein said sequence of wavelet bands include:

a first band representing a sum of the first and third intermediate results;

a second band representing a difference of the first and third intermediate results;

a third band representing a difference of the second and fourth intermediate results; and a fourth band representing a sum of the second and fourth intermediate result.

16. The machine readable medium of claim 15, wherein said second and third bands are generated by multiplying an intermediate result by a negative one, generating a product, and adding said product to an intermediate result.

17. The machine readable medium of claim 16, wherein said first and fourth bands are generated by multiplying an intermediate result by a positive one, generating a product, and adding said product to an intermediate result.

18. The machine readable medium of claim 17, wherein said sequence of instructions further include instructions, which when executed by a processor, cause said processor to perform the steps comprising of:

d.) unpacking four pixel data elements from the first packed data sequence to generate a third packed data sequence, and unpacking four pixel data elements from the second packed data sequence to generate a fourth packed data sequence.

19. The machine readable medium of claim 18, wherein said pixel data elements of said packed data sequences are eight bits in length prior to said unpacking.

20. The machine readable medium of claim 19, wherein after said step of unpacking, said pixel data elements are sixteen bits in length, said intermediate results are sixteen bits in length, and said wavelet bands are thirty-two bits in length.

21. The machine readable medium of claim 20, wherein said intermediate results further include:

a fifth intermediate result representing a sum of third pixel data elements in the first and second packed data sequences;

a sixth intermediate result representing a difference of the third pixel data elements in the first and second packed data sequences;

a seventh intermediate result representing a sum of fourth pixel data elements in the first and second packed data sequences; and an eighth intermediate result representing a difference of the fourth pixel data elements in the first and second packed data sequences.

22. The machine readable medium of claim 21, wherein said sequence of bands include:

a fifth band representing a sum of the fifth and seventh intermediate results;

a sixth band representing a difference of the fifth and seventh intermediate results;

a seventh band representing a difference of the sixth and eighth intermediate results; and an eighth band representing a sum of the sixth and eighth intermediate results.

23. The machine readable medium of claim 22, wherein said sequences of instructions further includes additional instructions which when executed by said processor, cause said processor to perform the additional steps comprising of:

e) generating a second set of intermediate results with the pixel data elements of the third and fourth packed data sequences.

24. The machine readable medium of claim 23, wherein said sequences of instructions further includes additional instructions which when executed by said processor, cause said processor to perform the additional steps comprising of:

f) generating a second sequence of bands with the second set of intermediate results.

25. A method for processing an image consisting of a plurality of pixel data elements, said method comprising the steps of:

loading said pixel data elements from a memory device in an order said pixel data elements are stored in said memory device, said pixel data elements loaded as first and second packed data sequences generating a set of intermediate results in response to a set of intermediate instruction signals, each of said intermediate results representing an arithmetic operation performed simultaneously between said pixel data elements in a first packed data sequence and corresponding pixel data elements in a second packed data sequence;

and in response to a set of final instruction signals, generating a set of final results, each final result representing an arithmetic operation simultaneously performed between two of said intermediate results.

26. The method of claim 25, wherein said set of intermediate results includes:

a first intermediate result representing a sum of first pixel data elements of the first and second packed data sequences;

a second intermediate result representing a difference of the first pixel data elements of the first and second packed data sequences;

a third intermediate result representing a sum of second pixel data elements of the first and second packed data sequences; and a fourth intermediate result representing a difference of the second pixel data elements of the first and second packed data sequences.

27. The method of claim 26, wherein said set of final results includes:

a first final result representing a sum of the first and third intermediate results;

a second final result representing a difference of the first and third intermediate results;

a third final result representing a difference of the second and fourth intermediate results; and a fourth final result representing a sum of the second and fourth intermediate results.

28. A method of processing an image consisting of a plurality of pixel data elements, comprising the computer implemented steps of:

a) storing said pixel data elements as first and second packed data sequences;

b) generating a set of intermediate results by performing arithmetic operations between the corresponding pixel data elements of said first and second packed data sequences, said intermediate results including a first intermediate result representing a sum of first pixel data elements in the first and second packed data sequences, a second intermediate result representing a difference of the first pixel data elements, a third intermediate result representing a sum of second pixel data elements in the first and second packed data sequences, a fourth intermediate result representing a difference of the second pixel data elements; and c) generating a sequence of bands by performing arithmetic operations between said intermediate results.

29. A machine-readable medium having stored thereon data representing sequences of instructions, said sequences of instructions which, when executed by a processor, cause said processor to perform the steps comprising of:

a) storing said pixel data elements as first and second packed data sequences;

b) generating a set of intermediate results by performing arithmetic operations between the corresponding pixel data elements of said first and second packed data sequences, said intermediate results including a first intermediate result representing a sum of first pixel data elements in the first and second packed data sequences, a second intermediate result representing a difference of the first pixel data elements, a third intermediate result representing a sum of second pixel data elements in the first and second packed data sequences, a fourth intermediate result representing a difference of the second pixel data elements; and c) generating a sequence of bands by performing arithmetic operations between said intermediate results.

* * * * *

UNITED STATES PATENT AND TRADEMARK OFFICE
CERTIFICATE OF CORRECTION

PATENT NO.   : 5,822,459
DATED        : October 13, 1998
INVENTOR(S)  : Macy

It is certified that error appears in the above-identified patent and that said Letters Patent is hereby corrected as shown below:

Column 4,
Line 28, delete "math" and insert -- main --.

Column 7,
Line 3, delete "(1,-1,1,-11)" and insert-- (1,-1,1,-1) --.

Signed and Sealed this

Fifth Day of August, 2003

JAMES E. ROGAN
*Director of the United States Patent and Trademark Office*